US010165355B2

(12) United States Patent
Negi et al.

(10) Patent No.: US 10,165,355 B2
(45) Date of Patent: Dec. 25, 2018

(54) SYSTEM AND METHOD FOR DATA TRANSMISSION AND POWER SUPPLY CAPABILITY OVER AN AUDIO JACK FOR MOBILE DEVICES

(71) Applicant: Intel Corporation, Santa Clara, CA (US)

(72) Inventors: Indira Negi, San Jose, CA (US); Lakshman Krishnamurthy, Portland, OR (US); Brian K. Vogel, Santa Clara, CA (US); Darren S. Crews, Hillsboro, OR (US); Sai Hemachandra Vemprala, Tempe, AZ (US); Xiaochao Yang, San Jose, CA (US); Howard D. Millett, Cornelius, OR (US); Alexander Essaian, San Jose, CA (US); Alanson P. Sample, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/100,063

(22) PCT Filed: Dec. 28, 2013

(86) PCT No.: PCT/US2013/078143
§ 371 (c)(1),
(2) Date: May 27, 2016

(87) PCT Pub. No.: WO2015/099795
PCT Pub. Date: Jul. 2, 2015

(65) Prior Publication Data
US 2017/0034618 A1 Feb. 2, 2017

(51) Int. Cl.
*G06F 17/00* (2006.01)
*H04R 3/00* (2006.01)
(Continued)

(52) U.S. Cl.
CPC ............... *H04R 3/00* (2013.01); *G10L 19/00* (2013.01); *H04M 1/6058* (2013.01); *H04Q 1/54* (2013.01);
(Continued)

(58) Field of Classification Search
CPC ...... H04R 1/1025; H04R 1/1041; H04R 3/00; H04M 1/6058
See application file for complete search history.

(56) References Cited

U.S. PATENT DOCUMENTS

2007/0195963 A1 8/2007 Ko et al.
2007/0291684 A1 12/2007 Lee et al.
(Continued)

FOREIGN PATENT DOCUMENTS

CN 102892068 1/2013
CN 103124076 5/2013
(Continued)

OTHER PUBLICATIONS

International Preliminary Report on Patentability and Written Opinion Received for PCT Patent Application No. PCT/US2013/078143, dated Jul. 7, 2016, 9 pages.
(Continued)

*Primary Examiner* — Joseph Saunders, Jr.
(74) *Attorney, Agent, or Firm* — Hanley, Flight & Zimmerman, LLC.

(57) ABSTRACT

A system and method for data transmission and power supply capability over an audio jack for mobile devices are disclosed. A particular embodiment includes: a peripheral device including an energy storage component, a microphone using a microphone bias voltage, and a select switch configured to provide a first switch position wherein charging of the energy storage component using the microphone bias voltage via the microphone conductor is enabled, the
(Continued)

select switch being configured provide a second switch position wherein charging of the energy storage component using the microphone bias voltage via the microphone conductor is disabled; and a mobile device and an application (app) executable in the mobile device to produce a switching tone on the audio signal conductor of the audio jack, the switching tone causing the select switch to transition to the first switch position or the second switch position.

17 Claims, 12 Drawing Sheets

(51) Int. Cl.
  *H04R 1/10* (2006.01)
  *H04M 1/60* (2006.01)
  *G10L 19/00* (2013.01)
  *H04Q 1/54* (2006.01)
(52) U.S. Cl.
  CPC ......... *H04R 1/1025* (2013.01); *H04R 1/1041* (2013.01); *H04Q 2213/034* (2013.01)

(56) References Cited

U.S. PATENT DOCUMENTS

| | | | |
|---|---|---|---|
| 2008/0242378 A1* | 10/2008 | Lowles | H04M 1/6058 455/575.2 |
| 2009/0180630 A1 | 7/2009 | Sander et al. | |
| 2009/0180659 A1* | 7/2009 | Sander | H04M 1/05 381/384 |
| 2010/0217100 A1* | 8/2010 | LeBoeuf | A61B 5/00 600/301 |
| 2010/0260341 A1 | 10/2010 | Sander et al. | |
| 2011/0311084 A1 | 12/2011 | Drader | |
| 2012/0177213 A1 | 7/2012 | Le Faucheur | |
| 2015/0237435 A1 | 8/2015 | Wong et al. | |

FOREIGN PATENT DOCUMENTS

| | | |
|---|---|---|
| CN | 103260105 | 8/2013 |
| EP | 1976246 | 10/2008 |
| JP | 2006-086746 A | 3/2006 |
| WO | 2015/099795 A1 | 7/2016 |

OTHER PUBLICATIONS

International Search Report with Written Opinion received for PCT Application No. PCT/US2013/078143 dated Sep. 26, 2014, 13 Pages.
European Patent Office, "European Search Report," issued in connection with application No. 13900414.7 dated Jun. 21, 2017, 14 pages.
European Patent Office, "Communication Pursuant to Rules 70(2) and 70a(2) EPC," issued in connection with application No. 13900414.7 dated Jul. 7, 2017, 1 page.
Verma et al., "AudioDAQ: Turning the Mobile Phone's Ubiquitous Headset Port into a Universal Data Acquisition Interface," Electrical Engineering and Computer Science Department University of Michigan, 2012, 14 pages.
Kuo et al., "Hijacking Power and Bandwidth from the Mobile Phone's Audio Interface," Electrical Engineering and Computer Science Department University of Michigan, Dec. 17-18, 2010, 10 pages.
European Patent Office, "Examination Report," issued in connection with application No. 13900414.7, dated Mar. 12, 2018, 6 pages.
Intellectual Property Office of China, "Office Action," issued in connection with application No. 2018042701992110, dated May 3, 2018, 16 pages.

* cited by examiner

SPEAKER AUDIO ENERGY HARVEST

CONTINUOUS CURRENT CHARGE

SYSTEM AND METHOD FOR DATA TRANSMISSION AND POWER SUPPLY CAPABILITY OVER AN AUDIO JACK FOR MOBILE DEVICES PROCESSING LOGIC
-1100-

PROVIDE A PERIPHERAL DEVICE INCLUDING AN ENERGY STORAGE COMPONENT, A MICROPHONE USING A MICROPHONE BIAS VOLTAGE, AND A SELECT SWITCH.
-1110-

CONFIGURE THE SELECT SWITCH TO PROVIDE A FIRST SWITCH POSITION WHEREIN CHARGING OF THE ENERGY STORAGE COMPONENT USING THE MICROPHONE BIAS VOLTAGE VIA THE MICROPHONE CONDUCTOR IS ENABLED.
-1120-

CONFIGURE THE SELECT SWITCH TO PROVIDE A SECOND SWITCH POSITION WHEREIN CHARGING OF THE ENERGY STORAGE COMPONENT USING THE MICROPHONE BIAS VOLTAGE VIA THE MICROPHONE CONDUCTOR IS DISABLED.
-1130-

PROVIDE A MOBILE DEVICE AND AN APPLICATION (APP) EXECUTABLE IN THE MOBILE DEVICE.
-1140-

PRODUCE A SWITCHING TONE ON THE AUDIO SIGNAL CONDUCTOR OF THE AUDIO JACK TO CAUSE THE SELECT SWITCH TO TRANSITION TO THE FIRST SWITCH POSITION OR THE SECOND SWITCH POSITION.
-1150-

END

FIGURE 11

SYSTEM AND METHOD FOR DATA TRANSMISSION AND POWER SUPPLY CAPABILITY OVER AN AUDIO JACK FOR MOBILE DEVICES

TECHNICAL FIELD

This patent application relates to electronic systems, peripheral devices, mobile devices, and computer-implemented software, according to various example embodiments, and more specifically to a system and method for data transmission and power supply capability over an audio jack for mobile devices.

BACKGROUND

Smartphones are becoming the predominant link between people and information. Most current smartphones or other mobile devices provide a capability to use mobile software applications (apps). A mobile software application (app) can embody a defined set of functionality and can be installed and executed on a mobile device, such as a smartphone, a tablet device, laptop computer, a digital camera, or other form of mobile computing, imaging, or communications device. Conventional mobile apps are available that focus on particular applications or functionality sets. Additionally, most standard mobile phones and other mobile devices have an audio/microphone connector or audio jack into which a headset, earbuds, or other peripheral device connector can be plugged. Most standard headsets or earbud accessories also include a microphone so the user can both hear audio from the phone and speak into the phone via the headset or earbud accessory. A plug connected to the headsets, earbuds, or other peripheral device can include separate conductive elements to transfer electrical signals corresponding to the left ear audio, right ear audio, microphone audio, and ground. The plug is compatible with the mobile device audio jack. The standard headsets or earbud accessories are configured to be placed over or attached to the ear(s) of a person, and include one or more speakers and a microphone. The headset may also include an arm that is attached to a housing that supports the microphone. The arm may be movable between a stored position and an extended, operative position. The headset, earbuds, the arm, and/or other types of peripheral devices may include one or more physiological or biometric sensors, environmental sensors, and/or other types of data-producing elements.

Computing devices, communication devices, imaging devices, electronic devices, accessories, or other types of peripheral devices designed to be worn or attached to a user (denoted as wearables or wearable devices) and the associated user experience are also becoming very popular. Mobile phone headsets and earbud accessories are examples of such wearables. Because wearable devices are typically worn by or attached to the user all or most of the time, it is important that wearables serve as a helpful tool aiding the user when needed, and not become an annoying distraction when the user is trying to focus on other things.

A major problem with conventional peripheral devices is that people need to keep them charged to be able to use them. Peripheral devices can run out of charge while being used and they can't be used until they are recharged. Peripheral devices typically have their own charging cords and adapters that need to be carried everywhere if the accessory tends to run out of battery power quickly. Many times this cumbersome user experience is the reason users abandon peripheral devices.

One form of a wearable device is a heart rate (HR) monitor. Existing heart rate monitoring solutions in the market are mostly electrocardiogram (ECG) based chest straps that transmit data to a watch that has a display. An electrocardiogram (EKG or ECG) is a test that determines heart rate based on the electrical activity of the heart. Other types of conventional HR monitors are also ECG based, but only have a watch on one hand and the user needs to pause to measure by touching it with the other hand. A Valencell™ brand product has a PPG (photoplethysmography) based solution for HR monitoring in earphones. PPG is an optical sensing technique that allows measurement of blood pulsation from the skin surface. The Valencell™ brand product has a sensor in the earbud and a digital signal processor (DSP) and Bluetooth™ radio in a medallion or other separate component connected to the earbuds. The user can clip the separate medallion on their clothes or wear the separate component. HR data is wirelessly transmitted periodically from the medallion or other separate component to an app in a mobile phone. Other biometric data like calories, VO2 (oxygen consumption), etc. can also be calculated by the app in the mobile phone. However, the Valencell™ brand products and similar devices need to include an electrical power source and need to be periodically recharged, which can be an inconvenience to the user. These devices also produce a cumbersome user experience with the need for a medallion or other separate component attached to the user.

BRIEF DESCRIPTION OF THE DRAWINGS

The various embodiments are illustrated by way of example, and not by way of limitation; in the figures of the accompanying drawings in which:

FIG. 11 is a processing flow chart illustrating an example embodiment of a method as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for data transmission and power supply capability over an audio jack for mobile devices are disclosed. In an example embodiment described herein, a peripheral device, such as a wearable device (e.g., a headset or earbuds), is configured to include a data-producing component. In one embodiment, the data-producing component can be a biometric sensor, such as a heart rate sensor, which can produce sensor data in the peripheral device. In the example embodiment, this sensor data can be transmitted to a mobile device, such as a mobile phone, to which the peripheral device is coupled via an audio/microphone wire and an audio jack of the mobile device. Additionally, the example embodiment enables the peripheral device to obtain electrical power from the mobile device via the audio jack of the mobile device. As a result, the peripheral device does not need to be separately powered or recharged. Moreover, the peripheral device does not need to include bulky medallions or separate components and does not need to establish a wireless data connection with the mobile device. Various embodiments are described in more detail below. In a particular embodiment, the described data-producing component in the peripheral device can be a biometric sensor. However, it will be apparent to those of ordinary skill in the art in view of the disclosure herein that many other types of data-producing components in the peripheral device may be similarly deployed. For example, these other types of data-producing components can include environmental sensors, motion sensors, image or video-producing devices, and the like.

At least two basic problems are solved by the example embodiments described herein. These problems include: 1) how can data be sent from the peripheral device to the mobile device, and 2) how can electrical power for the peripheral device be captured via the audio/microphone wire and audio jack of the mobile device, without interference to the audio or microphone signals (e.g., during a phone call) in other words, how can electrical power be transferred from the mobile device to the peripheral device via the audio jack, so the user doesn't need to charge the peripheral device. The solutions provided by the various example embodiments are described in more detail below. It will be apparent to those of ordinary skill in the art in view of the disclosure herein that the embodiments shown and described herein are examples of the described innovative solutions and alternative embodiments are similarly covered by the scope of the claims herein.

Figure 1:
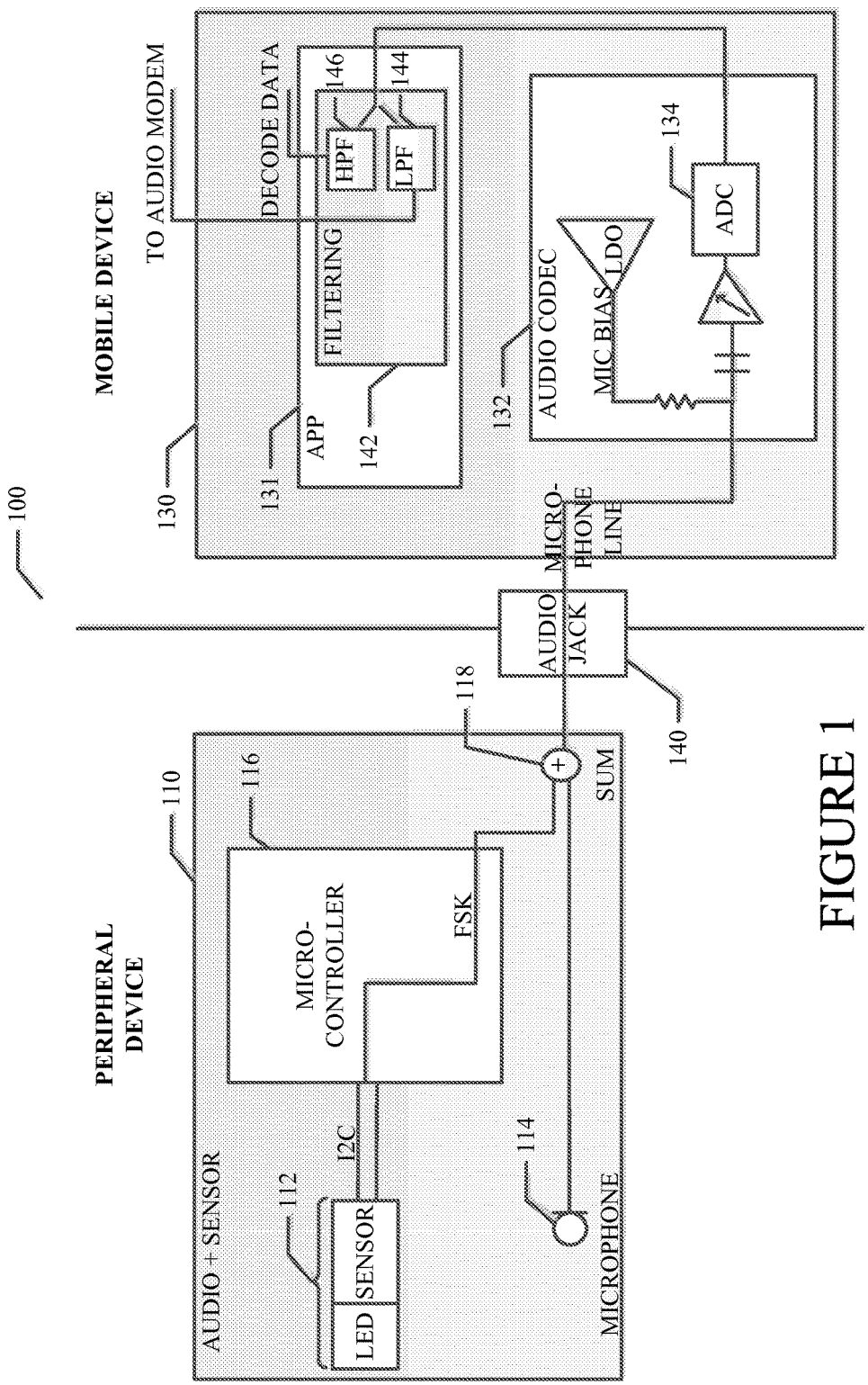
FIG. 1 illustrates an example embodiment configured for sending data from a peripheral device to a mobile device via the audio/microphone wire and the audio jack.

Sending Data from a Peripheral Device to a Mobile Device via the Audio/Microphone Wire and Audio Jack Referring now to FIG. 1, an example embodiment 100 described herein is configured for sending data from a peripheral device to a mobile device via the audio/microphone wire and the audio jack. In the embodiment of FIG. 1, a peripheral device 110 (e.g., headsets, earbuds, or the like) can include one or more sensors 112. As described above, these sensors can be biometric sensors, environmental sensors, or other data-producing component. In a particular example embodiment, the sensors can be optical sensors for detecting heart rate, an infrared (IR) LED, an accelerometer, and/or the like. The peripheral device 110 can also include a microphone 114, which can transfer audio signals from the peripheral device 110 to a mobile device 130 via an electrical (audio/microphone) wire and audio jack in a standard manner. The peripheral device 110 can also be configured to include a microcontroller (e.g. an MSP430, or other type of microcontroller). It will be apparent to those of ordinary skill in the art in view of the disclosure herein that a variety of standard microcontrollers, application specific integrated circuits (ASICs), field programmable gate arrays (FPGAs), discrete logic circuits, or other circuitry or logic can be similarly used as the microcontroller of the example embodiments. The microcontroller 116 can receive the sensor data produced by the sensors 112. The sensor data produced by the one or more sensors 112 in the peripheral device 110 can be encoded into a modulation format and sent to the microcontroller 116 for processing. In one example embodiment, the sensor data is provided as I2C signals. I2C (also denoted I²C or Inter-Integrated Circuit) is a multimaster, serial, single-ended computer bus used for attaching low-speed peripherals to a motherboard, embedded system, cellphone, or other electronic device. It will be apparent to those of ordinary skill in the art that the sensor data can be provided in a variety of different forms, formats, protocols, or signals. The microcontroller 116 can convert the sensor data to an audio band signal using FSK (frequency-shift keying,) or other well-known encoding technique. The converted data from the sensors 112 is added into or otherwise combined with the audio/microphone wire signals using an adder 118 for transfer to a mobile device 130 via the standard audio jack 140.

Referring still to FIG. 1 a mobile device 130 of an example embodiment is shown coupled to the peripheral device 110 via audio jack 140. It will be apparent to those of ordinary skill in the art that devices other than a mobile phone can be similarly used. For example, the mobile device 130 can also include a smartphone, a tablet device, laptop computer, a personal digital assistant (PDA), global positioning system (GPS) device, an imaging device, an audio or video player or capture device, or other form of mobile computing, communications, or imaging device. Such mobile devices 130 can include standard components, such as an audio encoder/decoder (codec) 132 and analog-to-digital converter (ADC) 124. As described above, mobile device 130 can also include an application (app) 131, which can comprise downloaded software, firmware, or other form of customized processing logic. App 131 can be configured to include a filtering component 142. Filtering component 142 can include a low pass filter (LPF) 144 and a high pass filter (HPF) 146. App 131 can also be configured as processing logic or logic, at least a portion of which is partially implemented in hardware, the logic including the filtering component 142 coupled with an output of an analog-to-digital converter (ADC) 124, the filtering component 142 being configured to isolate encoded data received by the ADC 124 in an audio band signal via a microphone conductor of the audio jack 140.

Sensor data sent from the peripheral device 110 to the mobile device 130 via the audio/microphone wire and the audio jack 140 is received and sampled in the standard codex 132 provided in a conventional mobile device 130. The codec 132 can use the analog-to-digital converter (ADC) 134, to produce digital signals that are received by the filtering component 142 of the app 131 executing on the mobile device 130. The LPF 144 can be used to isolate the standard audio signals produced by microphone 114. These audio signals can be passed to an audio modem. The HPF 146 can be used to isolate the encoded sensor data received from the sensors 112. The isolated sensor data can be passed to a decoder component, which processes and analyzes the sensor data produced in peripheral device 110. In this manner, the example embodiment can send sensor data produced in a peripheral device to a mobile device for processing by a mobile device app via the audio/microphone wire and the audio jack of the mobile device. The described embodiment provides the advantage that sensor data can be transferred from the peripheral device to the mobile device via the audio jack without having to modify the hardware of the mobile device. Further, the embodiment does not require a wireless connection to the mobile device.

However, in other embodiments, data transfer from the peripheral device to the mobile device can be effected using standard Bluetooth™ Low Energy technology or frequency modulation (FM) radio signals to wirelessly transmit peripheral device data to the mobile device. The Bluetooth™ solution would be simpler, but would also be more costly and would consume more electrical power. The FM solution would require modifications to the mobile device and may not work with any mobile phone. It will be apparent to those of ordinary skill in the art in view of the disclosure herein that the embodiments shown and described herein are examples of sending data from a peripheral device to a mobile device via the audio/microphone wire and audio jack and alternative embodiments are similarly covered by the scope of the claims herein.

Supplying Power for a Peripheral Device from a Mobile Device via the Audio/Microphone Wire and Audio Jack In an example embodiment, electrical power is harvesting from the power supplied to the microphone of a peripheral device and sensor data is transferred over the audio/microphone wire and the audio jack, as described above, when the microphone is not in use (e.g., not being used for a phone call). By adding power harvesting and data transmission to the peripheral device, the peripheral device becomes an accessory that doesn't need charging and works whenever it is plugged into the audio jack of a mobile device. The power harvesting and data transmission does not interfere with the earphone speakers and users can listen to music. The various embodiments provide a platform that can be used to add different sensors and functionality into the peripheral device. This platform can be opened up to developers to build devices and use this interface to power their devices and transmit data to a mobile device, such as a mobile phone. Most of the embodiments described herein do not require any hardware modifications to the mobile device, and therefore the embodiments described herein can work with any mobile device.

In various example embodiments described herein, the peripheral device can be configured to include a data-producing component. In one embodiment, the data-producing component can be a biometric sensor, such as a heart rate sensor, which can produce sensor data in the peripheral device as described above. However, the various embodiments described herein are not limited to only capturing and processing heart rate data. The described embodiments do not require extra size, extra separate components, and do not require the extra hassle of charging. But, the described example embodiments can provide real-time data from the peripheral device, which can be used in a variety of applications in apps on the mobile device.

Referring now to FIGS. 2 through 6, a basic principle employed in an example embodiment is to harvest the electrical power supplied by the microphone bias voltage produced in a standard mobile device and to store the harvested electrical power when the microphone is not being used. Standard microphones, such as electrets, require a microphone bias voltage (e.g., 1.5V-3V) that is applied to the electret element to make the internal microphone circuitry work. On sonic standard microphones, this bias voltage is provided by a watch battery or other power source. Other microphones use a bias voltage (sometimes referred to as phantom power) supplied through balanced conductors of the audio/microphone wire. Most conventional mobile devices, such as mobile phones, tablets, laptops and many hand-held, devices also supply the bias voltage through the audio jack. If the microphone of the peripheral device does not require the bias voltage, the microphone will simply ignore the voltage as it is a high impedance low current supply that can be shorted out without damage.

This electrical energy harvested from the microphone bias voltage can be stored on a capacitor, a small battery, or other energy storage component in the peripheral device. This charged battery or capacitor can supply power to the components in the peripheral device as needed. In the particular use case example of heart rate sensors, the sensors can be powered using the electrical energy harvested from the mobile device and stored in the energy storage component. Additionally, the microcontroller used to collect, convert, and transmit the sensor data to the mobile device, as described above, can also be powered by the harvested energy.

The various embodiments described herein provide a data-producing component, such as a sensor, installed in the peripheral device. Software running on a mobile device app is used to collect and process real-time sensor data. The various embodiments described herein replace the conventional DSP, Bluetooth™ radio, and the battery with the embodiments described herein where the electrical power is drawn from the microphone bias voltage. As a result, the system configuration provides a peripheral device that doesn't need to be charged before being used, and is part of the normal peripheral device (e.g., a headset or earbuds) to which many users are already accustomed. Thus, the various embodiments described herein provide improvements over conventional peripheral devices and other accessories. The various embodiments described herein provide a much better user experience without the bulky size of the medallion or other separate components that contain a battery and Bluetooth™ radio. Further, the various embodiments do not need to set up a Bluetooth™ connection. Users of the presently described embodiments can plug a peripheral device into the audio jack of a mobile device and click on a sensor app (e.g., a heart rate monitoring app) on the mobile device to start monitoring. There is no need to carry chargers and/or charging cords to ensure the peripheral device can be charged if it runs out of power. Various alternative embodiments are described in more detail below.

Figure 2:
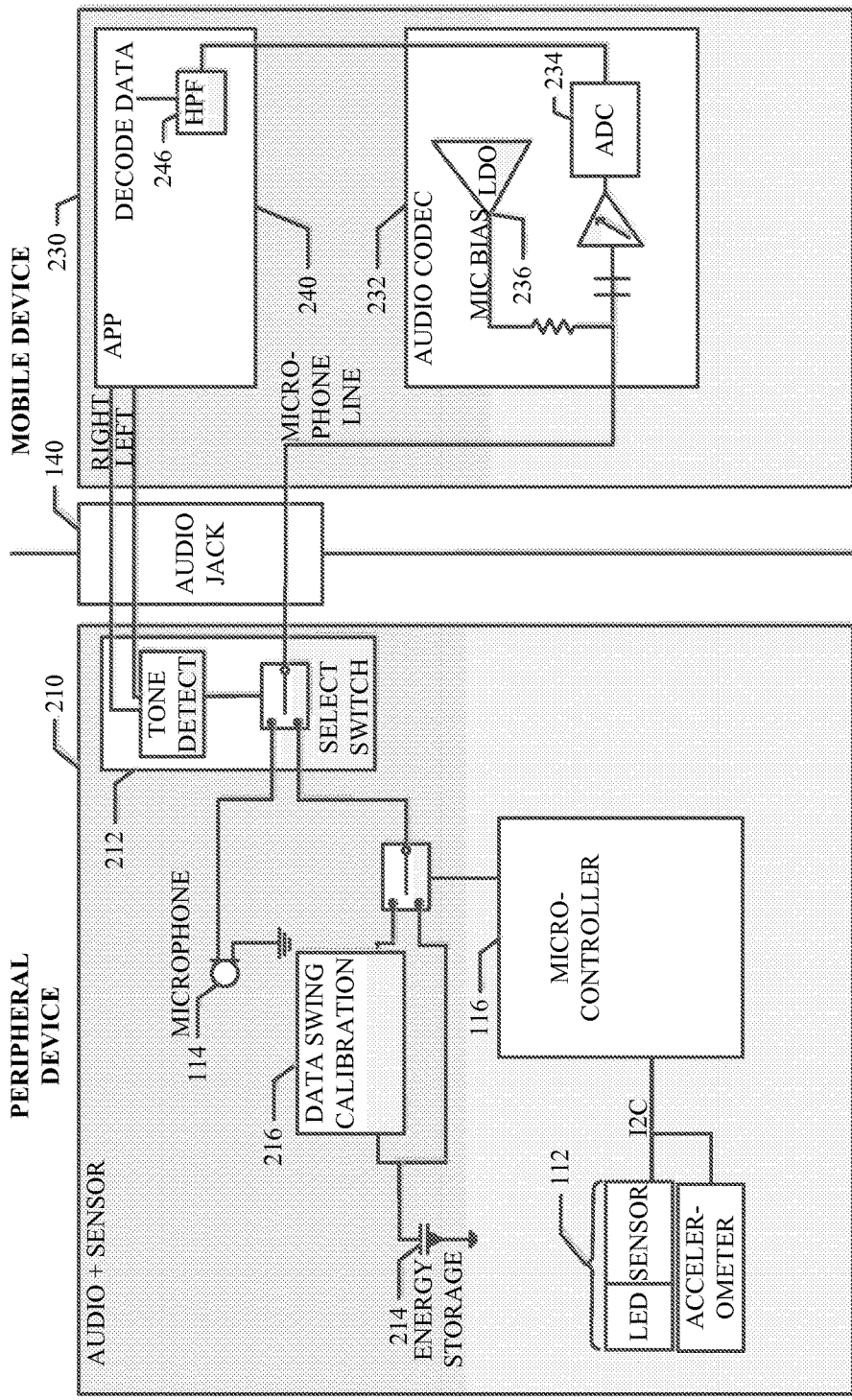
FIG. 2 illustrates an example embodiment configured for supplying power for a peripheral device from a mobile device via the audio/microphone wire and audio jack, wherein the system includes microphone switching.

Referring now to FIG. 2, an example embodiment illustrates a system architecture configured for supplying power for a peripheral device from a mobile device via the audio/microphone wire and audio jack, wherein the system includes microphone switching. Because the harvesting of power via the audio/microphone wire may interfere with the transfer of standard microphone audio or the transfer of sensor data to the mobile device, the example embodiment illustrated in FIG. 2 includes a microphone switching capability. As shown in FIG. 2, the system architecture includes a mobile device 230 as coupled to a peripheral device 210 via an audio/microphone wire and audio jack 140. The mobile device 230 includes the standard audio codec 232 and app 240. As described above, the mobile device 230 can receive data from peripheral device 210 via audio jack 140. The app 240 can decode this data using ADC 234 and HPF 246. As also shown in FIG. 2, the audio codec 232 of the standard mobile device 230 includes a low-dropout regulator (LDO) 236 (or other microphone bias voltage producing component) that produces the microphone bias voltage as described above.

In the example embodiment shown in FIG. 2, the peripheral device 210 is configured to include microphone switch 212 and energy storage component 214. In one embodiment, the switch 212 can be implemented as a physical two-position switch that can be positioned by the user. In a first switch position, the example embodiment harvests power supplied to the microphone 114 and stores the harvested power in energy storage component 214, such as a battery or capacitor. In the first switch position, data and audio transmission over the audio/microphone wire is disabled, for example, when the microphone 114 is not needed for a phone call. In a second switch position, the example embodiment enables data and audio transmission over the audio/microphone wire and disables the harvesting of power supplied to the microphone 114.

In another embodiment, the switch 212 can be implemented as a tone detection switch that can be automatically positioned by a signal produced from the app 240 as shown in FIG. 2. For example, when the microphone 114 is needed for a phone call, the app 240 can produce a single frequency switching tone in the ultrasonic range in the left speaker for a pre-determined time period 200 milliseconds) to cause the switch 212 to toggle between the first position (or first state) and the second position (or second state) as described above. The switching tone can be transferred from the app 240 of the mobile device 230 via the left ear conductive element of the audio/microphone wire and audio jack 140. Alternatively, the right ear conductive element or other audio signal conductor) of the audio/microphone wire and audio jack 140 can be used for the switching tone. Because this switching tone is ultrasonic, it will not impact the user experience at all. Upon receiving the switching tone, the switch 212 can selectively enable or disable the harvesting of power supplied to the microphone 114 under control of the app 240. Because the app 240 can determine when the mobile device 230 needs the use of the microphone 114, the app 240 can control the switch 212 to enable the microphone 114 for the transfer of data or audio when it is needed. The rest of the time, the app 240 can control the switch 212 to disable data and audio transmission over the audio/microphone wire and enable the harvesting and storage of electrical power supplied to the microphone 114 via LDO 236 and audio jack 140.

In a particular embodiment, the energy from the microphone bias voltage is stored in the energy storage component 214 for a portion (e.g., 75%) of each time period. The data from the sensors 112 can be read and transmitted to the app 240 in the remaining portion (e.g., 25%) of the time period. A transition from low to high, such as when data transfer is enabled and power harvesting is disabled, can be made by switching the microphone line from the energy storage device 214 to the data swing calibration resistor 216. This transition divides the potential between the internal phone resistor and the data swing calibration resistor 216, so the voltage on the microphone line jumps up. Switching the microphone line back to the energy storage component 214 Unities a high to low transition. The data swing calibration resistor 216 has been sized to keep the voltage swing within the standard audio input signal levels. Because the microphone line is coupled to the ADC 234 in the mobile device, well-known Manchester encoding can be used to ensure that every bit has a transition. The energy storage component 214 has been sized to ensure that the voltage swing due to the energy storage component 214 charging and discharging is smaller than data transition voltage swings. Because each time period is only 40 milliseconds in an example embodiment, this ensures that the changing levels of the energy storage component 214 do not get sampled by the mobile device 230.

Referring now to FIGS. 3 through 6, various example embodiments illustrate alternative system architectures for supplying power for a peripheral device from a mobile device via the audio/microphone wire and audio jack, wherein the systems include microphone switching. As described above, the various example embodiments harvest power from the microphone bias voltage and store the harvested power in an energy storage component 214 for part of the time, such as when the microphone 114 is not needed for a phone call. In this case, the app 240 can generate a switching tone to cause the switch 212 to change to a first switch position, wherein data and audio transmission over the audio/microphone wire is disabled. When the microphone is needed for a phone call or data transmission is needed from the peripheral device 310, the app 240 can produce the switching tone to switch the microphone line back to the microphone 114 as described above. In this case, data and audio transmission over the audio/microphone wire is enabled and power harvesting is disabled.

Figure 3:
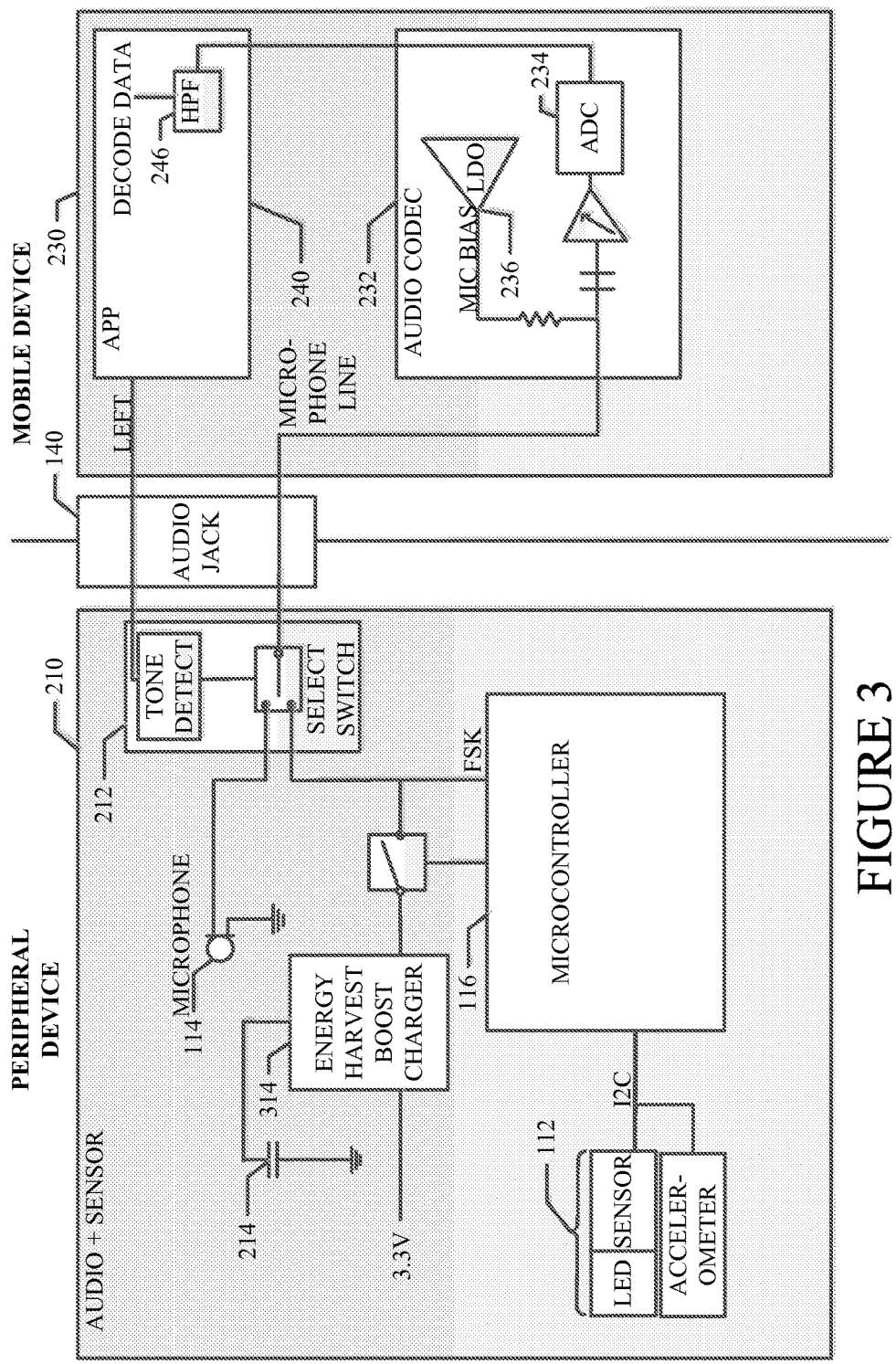
FIG. 3 illustrates an example embodiment in which an energy harvest boost charger can he added to the circuitry of the peripheral device.

In the embodiment illustrated in FIG. 3, an energy harvest boost charger 314 can be added to the circuitry of the peripheral device 210 as shown. In some circumstances, the components of the peripheral device 210 may need a higher power level to operate properly. The energy harvest boost charger 314 can serve to increase the available power output produced by the power harvesting system of the peripheral device 210. In the embodiment shown in FIG. 3, the switch 212 can be implemented as a tone detection switch that can be automatically positioned by a signal produced from the app 240. For example, when the microphone 114 is needed for a phone call, the app 240 can produce a single frequency switching tone in the ultrasonic range in the left speaker for a pre-determined time period (e.g., 200 milliseconds) to cause the switch 212 to toggle between a first position and a second position as described above. The switching tone can be transferred from the app 240 of the mobile device 230 via the left ear conductive element of the audio/microphone wire and audio jack 140. In other respects, the system design shown in FIG. 3 can operate in a manner similar to the system architectures described above.

Figure 4:
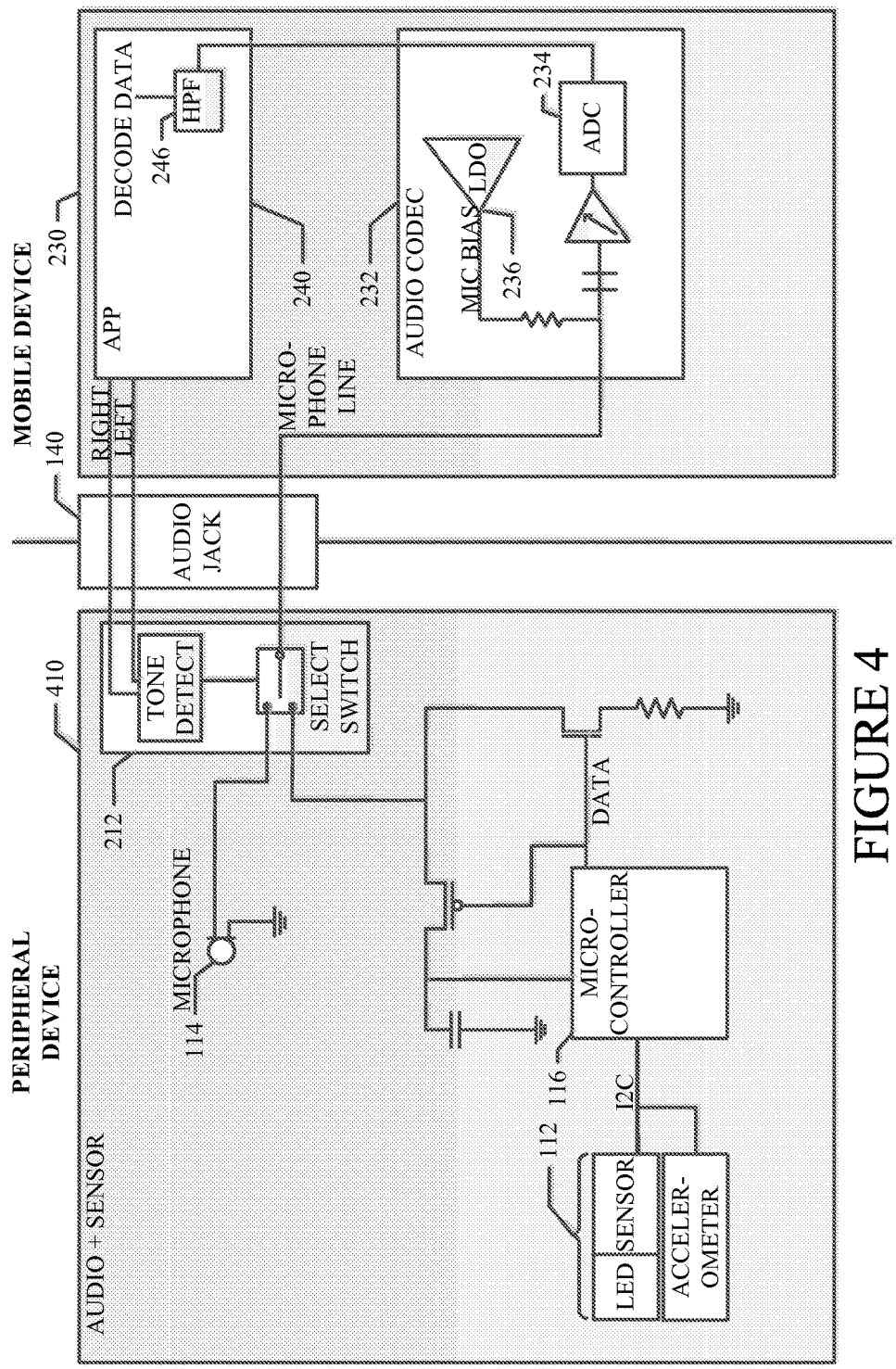
FIG. 4 illustrates an alternative example embodiment for selectively drawing power from the microphone line of a mobile device via the audio jack.

In the embodiment illustrated in FIG. 4, a particular voltage can be maintained on the microphone line while power is selectively drawn from the microphone line of the mobile device 230 via audio jack 140. In other respects, the system design shown in the alternative embodiment of FIG. 4 can operate in a manner similar to the system architectures described above.

Figure 5:
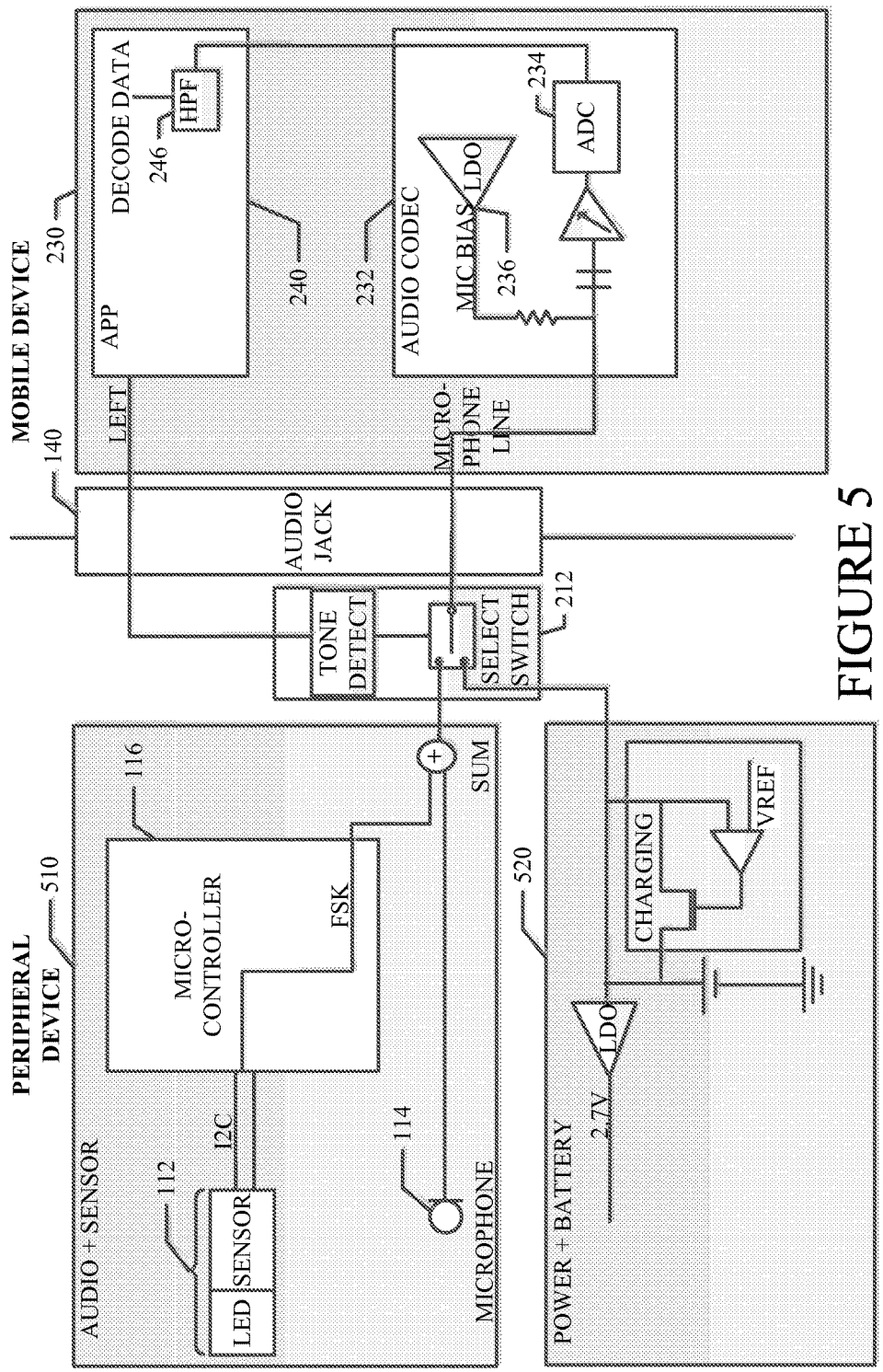
FIG. 5 illustrates an example embodiment in which a power storage unit is shown in combination with the peripheral device and mobile device.

In the embodiment illustrated in FIG. 5, a power storage unit 520 is shown in combination with the peripheral device 510 and mobile device 230, The power storage unit 520 can be coupled to and draw power from the microphone line of the mobile device 230 via the select switch and audio jack 140. In the embodiment shown in FIG. 5, the switch 212 can be implemented as a tone detection switch that can be automatically positioned by a signal produced from the app 240. For example, when the microphone 114 is needed for a phone call, the app 240 can produce a single frequency switching tone in the ultrasonic range in the left speaker for a pre-determined time period (e.g., 200 milliseconds) to cause the switch 212 to toggle between a first position and a second position as described above. The switching tone can be transferred from the app 240 of the mobile device 230 via the left ear conductive element of the audio/microphone wire and audio jack 140. The power storage elements of the power storage unit 520 can be charged via the microphone line as described above when the microphone 114 is not needed for capturing audio signals. In other respects, the system design shown in FIG. 5 can operate in a manner similar to the system architectures described above.

Figure 6:
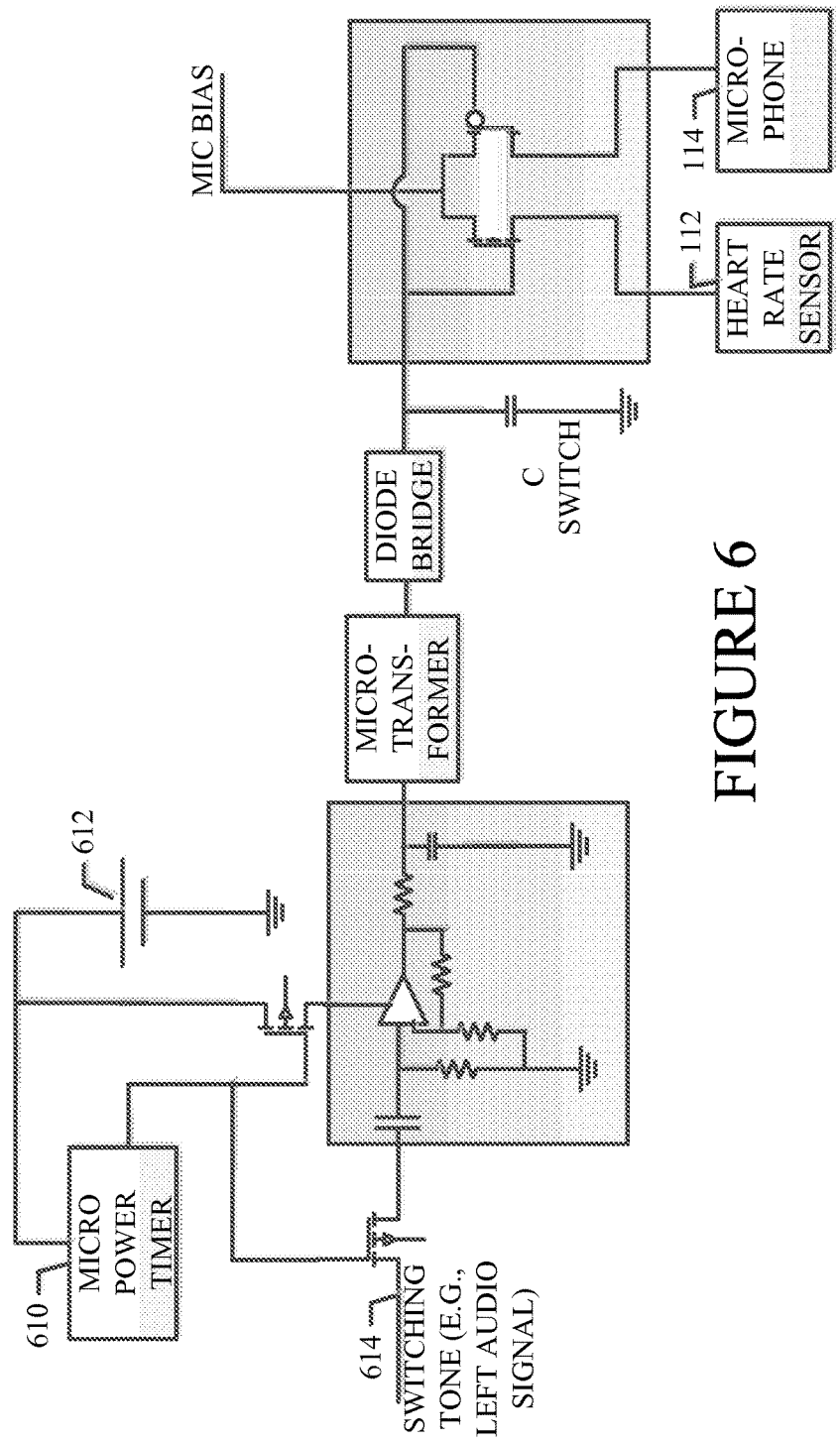
FIG. 6 illustrates an example embodiment of a tone detect circuit with a battery.

FIG. 6 illustrates an example embodiment of a tone detect circuit with a battery, As shown, the system can use a power timer 610 (e.g., a CSS555C micro power timer) to manage the charging of battery 612. In the embodiment shown in FIG. 6, the battery 612 can be selectively charged based on a switching tone 614 received from the mobile device 230 (not shown). For example, when the microphone 114 is needed for a phone call, the mobile device 230 can produce a single frequency switching tone 614 in the ultrasonic range in the left speaker for a pre-determined time period (e.g., 200 milliseconds) to toggle between the first position and the second position as described above. The switching tone 614 can be transferred from the mobile device 230 via the left ear conductive element of the audio/microphone wire and audio jack 140. The battery 612 can be charged via the microphone line bias voltage as described above when the microphone 114 is not needed for capturing audio signals. In the various embodiments described above, the system does not interfere with audio quality and does not require modifications to the hardware of the mobile device 230.

Figure 7:
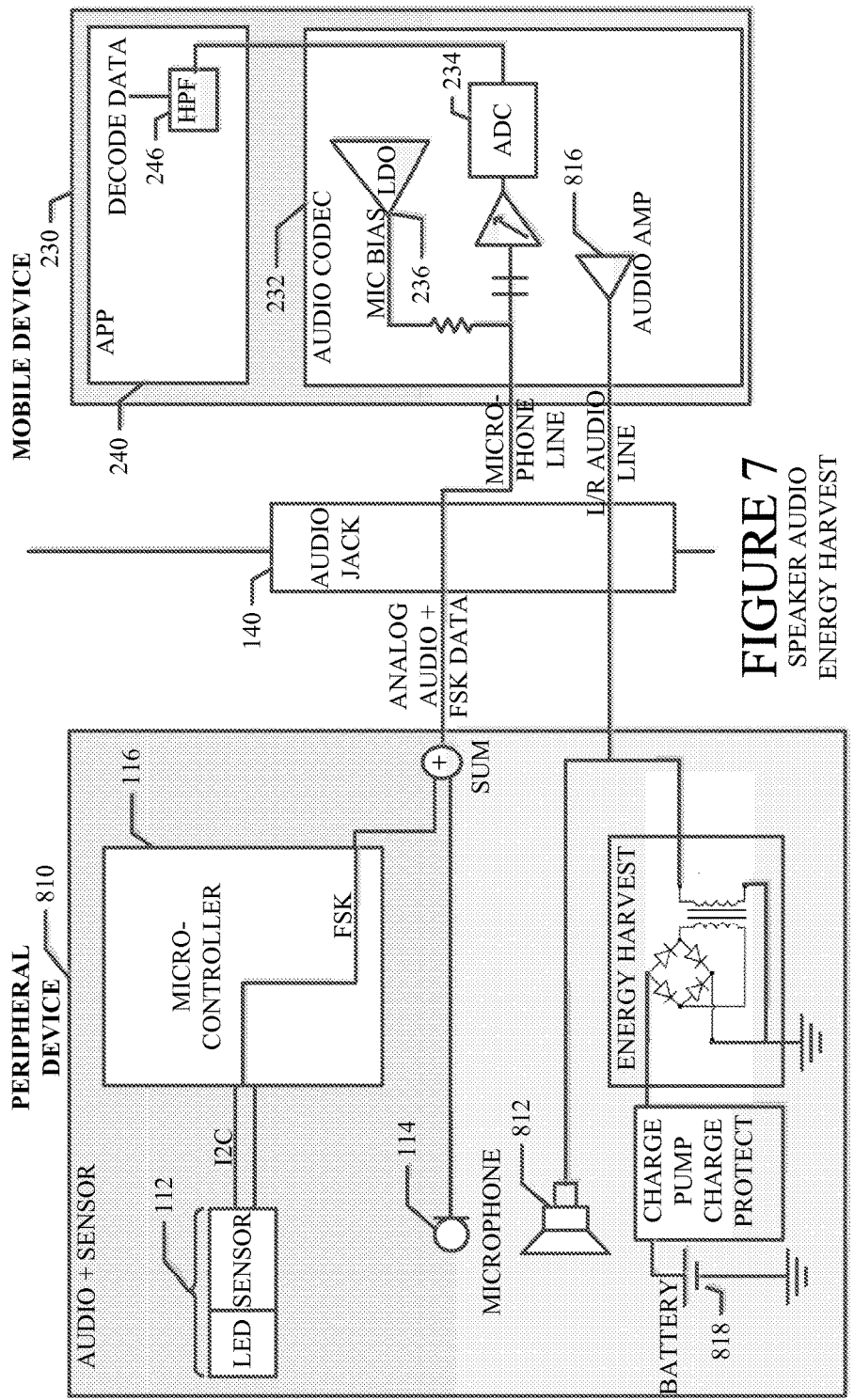
FIG. 7 illustrates an example embodiment configured to partially harvest the energy from the audio signal being sent to the speakers of a peripheral device.

Referring now to FIG. 7, an example embodiment described herein partially harvests the energy from the audio signals being sent to the sneakers 812 of a peripheral device 810. In the example embodiment shown, an audio amplifier 816 is provided in a standard mobile device 230 to drive the audio signals in the left and right speakers 812 of the peripheral device 810. A portion of the electrical energy used for driving the audio signals can be harvested by the embodiment shown in FIG. 7 and used to charge the battery 818 in the peripheral device 810. In the various embodiments described above with respect to FIG. 7, the system does not require modifications to the hardware of the mobile device 230. Additionally, the sensor data generated by sensors 112 can be transferred to the mobile device 230 via the microphone line and audio jack 140 as described above.

Figure 8:
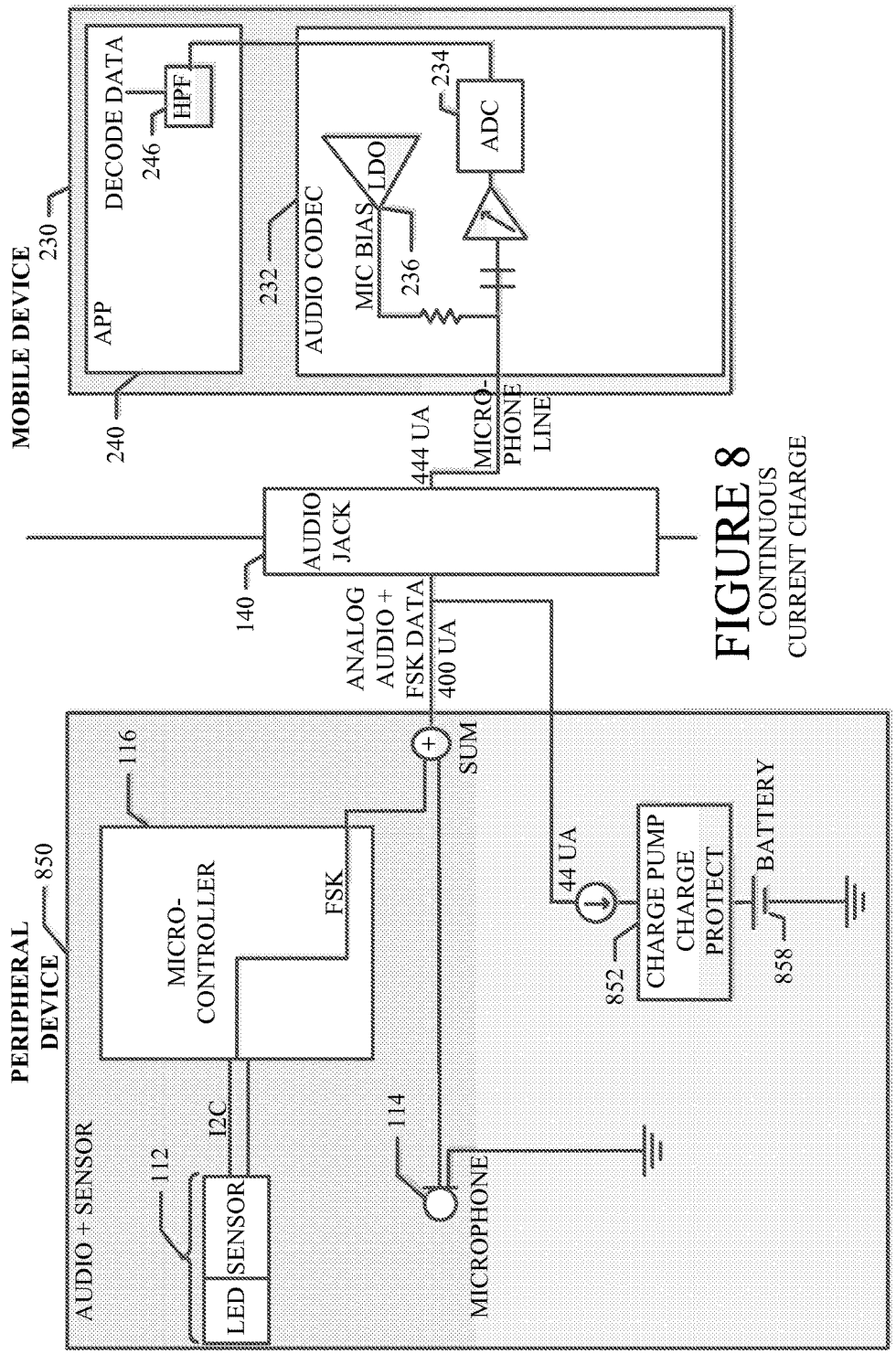
FIG. 8 illustrates an example embodiment configured to continuously charge the battery in the peripheral device for the entire duration by partially harvesting the energy from the microphone bias voltage present on the microphone line.

Referring now to FIG. 8, an example embodiment described herein continuously charges the battery 858 in the peripheral device 850 for the entire duration by partially harvesting the energy from the microphone bias voltage present on the microphone line. In the example embodiment shown, a charge pump 852 is provided and connected to the microphone line. The charge pump 852 taps a portion of the microphone bias voltage present on the microphone line. For example, if the microphone bias voltage draws a current of 444 µA, the charge pump 852 can be configured to tap a percentage (e.g., 10%) of the available current on the microphone line. In the example shown in FIG. 8, the charge pump 852 is configured to tap 10% of the available current on the microphone line. Thus, the charge pump 852 can charge the battery 858 using approx. 44 µA. The remaining 400 µA can be available for the microphone 114. It will be apparent to those of ordinary skill in the art in view of the disclosure herein that different levels of available energy may be present on the microphone line and different portions of the available energy can be tapped using similar techniques as described herein. In the various embodiments described above with respect to FIG. 8, the system does not require modifications to the hardware of the mobile device 230. Additionally, the sensor data generated by sensors 112 can be transferred to the mobile device 230 via the microphone line and audio jack 140 as described above.

Figure 9:
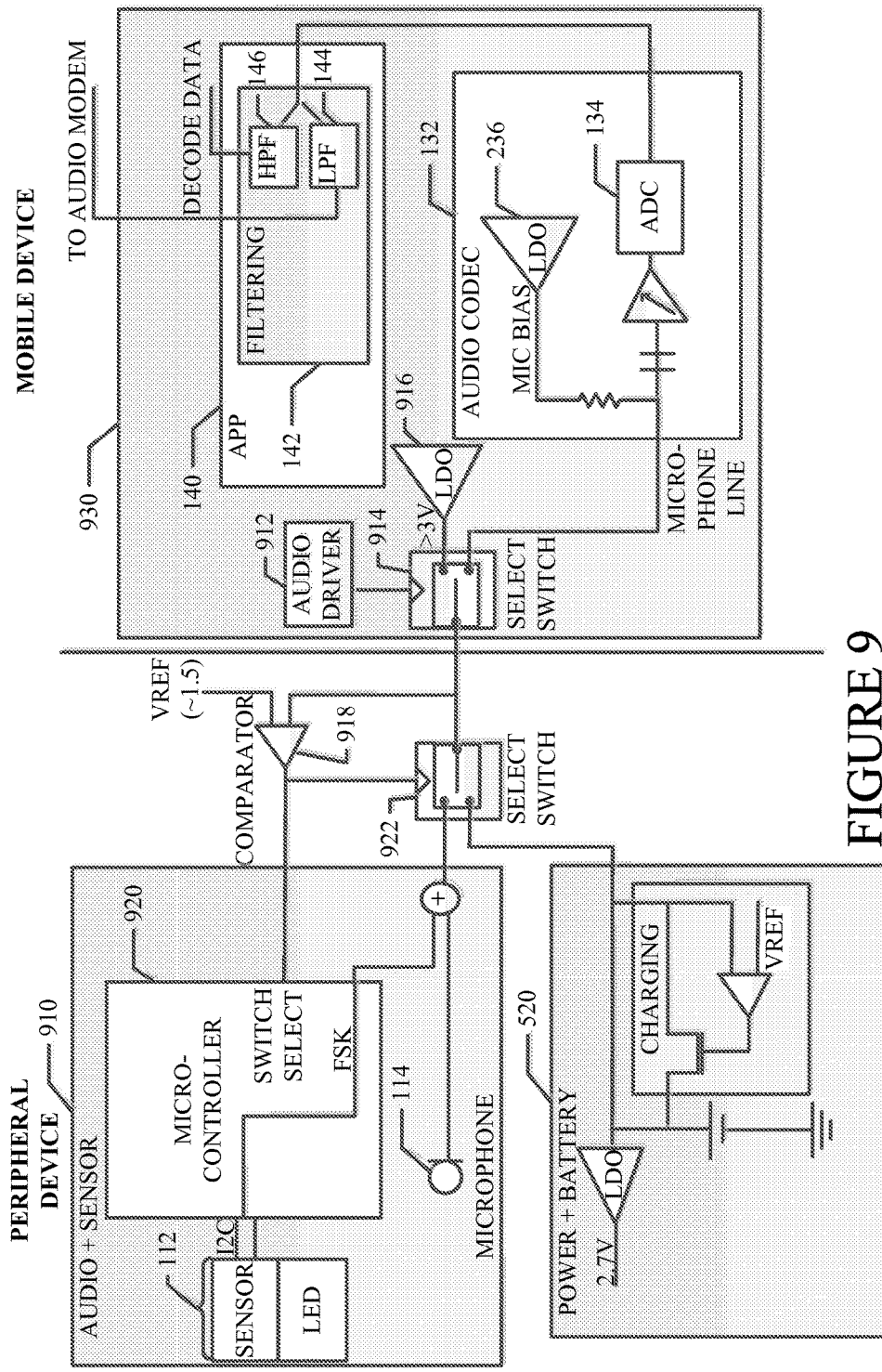
FIGS. 9 and 10 illustrate example embodiments configured to use information from an audio driver of the mobile device to determine when the microphone audio is being used.
Figure 10:
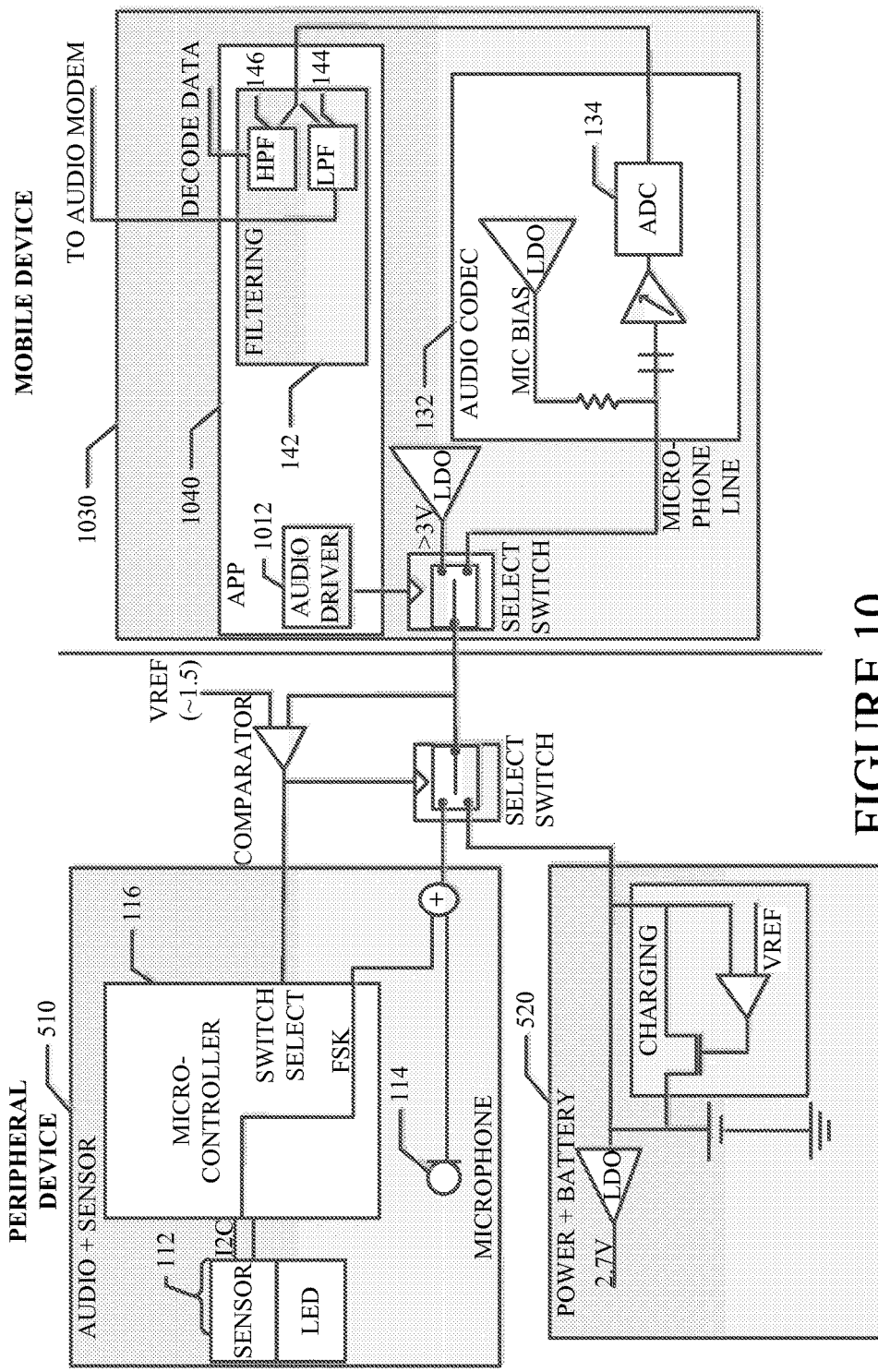

Referring now to FIGS. 9 and 10, an example embodiment described herein uses information from an audio driver 912 of the mobile device 930 to determine when the microphone audio is being used (or not being used). When it is determined that the microphone audio is not being used, a select switch 914 connected to the audio driver 912 is caused to switch the microphone line to a >3V low-dropout regulator (LDO) 916 for power supply. The different voltage provided by the LDO 916 is detected in the peripheral device 910 using comparator 918, When the comparator 918 detects the LDO 916 voltage, a switch selection operation is performed by the microcontroller 920. Additionally, select switch 922 is caused to switch to a position allowing the charging of the energy storage component 520 from the LDO 916 voltage provided on the microphone line. The charging of the energy storage component 520 can continue while the microphone audio is not being used.

When it is determined by audio driver 912 that the microphone audio is needed, the select switch 914 connected to the audio driver 912 is caused to switch the microphone line to the standard microphone bias voltage provided by LDO 236 and away from the LBO 916. The different voltage provided by the LDO 236 is detected in the peripheral device 910 using comparator 918. When the comparator 918 detects the LDO 236 voltage, a switch selection operation is performed by the microcontroller 920. Additionally, select switch 922 is caused to switch to a position disabling the charging of the energy storage component 520 from the microphone line. The charging of the energy storage component 520 is thereby disabled while the microphone audio is being used. In the various embodiments described above with respect to FIG. 9, the system does not interfere with audio quality. Additionally, the sensor data generated by sensors 112 can be transferred to the mobile device 930 via the microphone line and audio jack as described above.

Referring now to FIG. 10, an example embodiment described herein uses information from an audio driver 1012 of the mobile device 1030 to determine when the microphone audio is being used (or not being used) in a manner similar to the embodiment of FIG. 9 described above. However, in the embodiment of FIG. 10, the audio driver 1012 can be implemented in the app 1040 of mobile device 1030. In this manner, the hardware of the mobile device 1030 does not have to be modified to provide the audio driver 1012. In the embodiment of FIG. 10, the system also does not interfere with audio quality. Additionally, the sensor data generated by sensors 112 can be transferred to the mobile device 1030 via the microphone line and audio jack as described above.

Drawing current and transmitting modulated data over the microphone line is an unusual use of the microphone conductor of a standard audio jack 140. The various embodiments described herein allow a platform to be opened to accessory developers that allows them a method to use power from the microphone line, and to send data to a connected mobile device on the microphone line, without interfering with the user's experience of listening to music or otherwise using a peripheral device. As a result, any accessory developers can produce appealing accessories that work with the disclosed apparatus and a standard mobile device. The combination makes the mobile device and the peripheral device more attractive to the consumer.

Referring now to FIG. 11, a processing flow diagram illustrates an example embodiment of a method for data transmission and power supply capability over an audio jack for peripheral devices as described herein. The method 1100 of an example embodiment includes; providing a peripheral device including an energy storage component, a microphone using a microphone bias voltage, and a select switch (processing block 1110); configuring the select switch to provide a first switch position wherein charging of the energy storage component using the microphone bias voltage via the microphone conductor is enabled (processing block 1120); configuring the select switch to provide a second switch position wherein charging of the energy storage component using the microphone bias voltage via the microphone conductor is disabled (processing block 1130); providing a mobile device and an application (app) executable in the mobile device (processing block 1140); and producing a switching tone on the audio signal conductor of the audio jack to cause the select switch to transition to the first switch position or the second switch position (processing block 1150).

Figure 12:
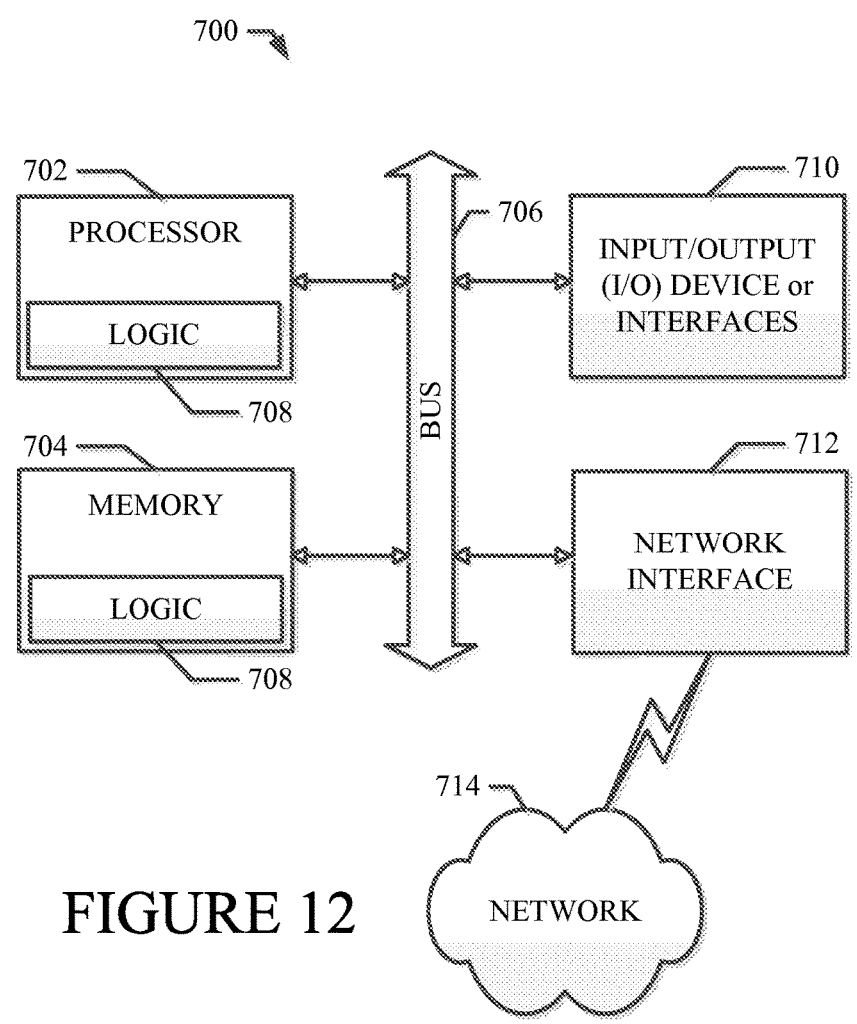
FIG. 12 shows a diagrammatic representation of a machine in the example firm of a mobile computing and/or communication system within which a set of instructions

FIG. 12 shows a diagrammatic representation of a machine in the example form of a mobile computing and/or communication system 700 within which a set of instructions when executed and/or processing logic when activated may cause the machine to perform any one or more of the methodologies described and/or claimed herein, In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment no machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine, Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured fur use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the fallowing examples.

A peripheral device comprising: a data-producing element; a microcontroller coupled to the data-producing element to receive data generated by the data-producing element, the microcontroller being further configured to encode the data into an audio band signal; and an adder to combine the encoded data with audio signals on a microphone line, the adder being further configured to transfer the combined audio signals to a mobile device via a microphone conductor of an audio jack.

The peripheral device as claimed above wherein the data-producing element is a biometric sensor.

The peripheral device as claimed above wherein the microcontroller being further configured to encode the data into an audio band signal using frequency-shift keying (FSK).

The peripheral device as claimed above wherein the mobile device is a mobile phone.

The peripheral device as claimed above further including: an energy storage component; a microphone using a microphone bias voltage; and a select switch being to the coupled to the energy storage component and the microphone, the select switch being further coupled to the microphone conductor and an audio signal conductor of the audio jack, the select switch being configured to provide a first switch position wherein data and audio transmission via the microphone conductor is disabled and charging of the energy storage component using the microphone bias voltage via the microphone conductor is enabled, the select switch being configured provide a second switch position wherein data and audio transmission via the microphone conductor is enabled and charging of the energy storage component using the microphone bias voltage via the microphone conductor is disabled.

The peripheral device as claimed above being further configured to produce sensor data for transfer to a mobile device via the microphone conductor of the audio jack.

The peripheral device as claimed above further including a data swing calibration component to regulate voltage swing when the energy storage component is transitioning between charging and not charging.

A mobile device comprising: logic, at least a portion of which is partially implemented in hardware, the logic configured to include a filtering component coupled with an output of an analog-to-digital converter (ADC), the filtering component being configured to isolate encoded data received by the ADC in an audio band signal via a microphone conductor of an audio jack.

The mobile device as claimed above wherein the encoded data is biometric sensor data.

The mobile device as claimed above wherein the mobile device is a mobile phone.

The mobile device as claimed above wherein: the logic being configured to produce a switching tone on an audio signal conductor of the audio jack, the switching tone selectively signaling a first state when data and audio reception via the microphone conductor is disabled, the switching tone selectively signaling a second state when data and audio reception via the microphone conductor is enabled.

The mobile device as claimed above wherein the switching tone is a single frequency tone in the ultrasonic range in a left speaker for a pre-determined time period.

The mobile device as claimed above being configured to isolate encoded data received in an audio band signal via the microphone conductor of the audio jack.

A system comprising: a peripheral device including a data-producing element, a microcontroller being coupled to the data-producing element to receive data generated by the data-producing element, the microcontroller being further configured to encode the data into an audio band signal, the peripheral device including an adder to combine the encoded data with audio signals on a microphone line, the adder being further configured to transfer the combined audio signals to a mobile device via a microphone conductor of an audio jack; and a mobile device including an encoder/decoder (codec), which includes an analog-to-digital converter (ADC) being coupled to the microphone conductor of the audio jack, the mobile device including an application (app) executable in the mobile device, the app including a filtering component coupled with an output of the ADC, the filtering component being configured to isolate the encoded data received in the combined audio signals via the microphone conductor of the audio jack.

The system as claimed above wherein the encoded data is biometric sensor data.

The system as claimed above wherein the mobile device is a mobile phone.

A system comprising: a peripheral device including an energy storage component, a microphone using a microphone bias voltage, and a select switch being to the coupled to the energy storage component and the microphone, the select switch being further coupled to a microphone conductor and an audio signal conductor of an audio jack, the select switch being configured to provide a first switch position wherein data and audio transmission via the microphone conductor is disabled and charging of the energy storage component using the microphone bias voltage via the microphone conductor is enabled, the select switch being configured provide a second switch position wherein data and audio transmission via the microphone conductor is enabled and charging of the energy storage component using the microphone bias voltage via the microphone conductor is disabled; and a mobile device including an encoder/decoder (codec) including a microphone bias voltage producing component being coupled to the microphone conductor of the audio jack, and an application (app) executable in the mobile device, the app being configured to produce a switching tone on the audio signal conductor of the audio jack, the switching tone causing the select switch to transition to the first switch position or the second switch position.

The system as claimed above being further configured to produce sensor data for transfer to the mobile device via the microphone conductor of the audio jack.

The system as claimed above further including a data swing calibration component to regulate voltage swing when the energy storage component is transitioning between charging and not charging.

The system as claimed above being configured to isolate encoded data received in an audio band signal via the microphone conductor of the audio jack.

A peripheral device method comprising: receiving data generated by a data-producing element; encoding the data into an audio band signal; combining the encoded data with audio signals on a microphone line; and transferring the combined audio signals to a mobile device via a microphone conductor of an audio jack.

The method as claimed above wherein the data-producing element is a biometric sensor.

The method as claimed above including encoding the data into an audio band grad using frequency-shift keying (FSK).

The method as claimed above wherein the mobile device is a mobile phone.

The method as claimed above further including: providing a first switch position wherein data and audio transmission via the microphone conductor is disabled and charging of an energy storage component using a microphone bias voltage via the microphone conductor is enabled; and providing a second switch position wherein data and audio transmission via the microphone conductor is enabled and charging of the energy storage component using the microphone bias voltage via the microphone conductor is disabled.

The method as claimed above including producing sensor data for transfer to the mobile device via the microphone conductor of the audio jack.

The method as claimed above including regulating voltage swing when the energy storage component is transitioning between charging and not charging.

A mobile device method comprising: providing a filtering component coupled with an output of an analog-to-digital converter (ADC); and using the filtering component to isolate encoded data received by the ADC in an audio band signal via a microphone conductor of an audio jack.

The method as claimed above wherein the encoded data is biometric sensor data.

The method as claimed above wherein the filtering component is provided in a mobile phone.

The method as claimed above including producing a switching tone on an audio signal conductor of the audio jack, the switching tone selectively signaling a first state when data and audio reception via the microphone conductor is disabled, the switching tone selectively signaling a second state when data and audio reception via the microphone conductor is enabled.

The method as claimed above wherein the switching tone is a single frequency tone in the ultrasonic range in a left speaker for a pre-determined time period.

The mobile device as claimed above including isolating encoded data received in an audio band signal via the microphone conductor of the audio jack.

A peripheral apparatus comprising: a data-producing means; a processing means coupled to the data-producing means to receive data generated by the data-producing means, the processing means being further configured to encode the data into an audio band signal; and combining means to combine the encoded data with audio signals on a microphone line, the combining means being further configured to transfer the combined audio signals to a mobile device via a microphone conductor of an audio jack.

The peripheral apparatus as claimed above wherein the data-producing means is a biometric sensor.

The peripheral apparatus as claimed above wherein the processing means being further configured to encode he data into an audio band signal using frequency-shift keying (FSK).

The peripheral apparatus as claimed above wherein the mobile device is mobile phone.

The peripheral apparatus as claimed above further including: an energy storage means; a microphone using a microphone bias voltage; and a select switching means being to the coupled to the energy storage means and the microphone, the select switching means being further coupled to the microphone conductor and an audio signal conductor of the audio jack, the select switching means being configured to provide a first switch position wherein data and audio transmission via the microphone conductor is disabled and charging of the energy storage means using the microphone bias voltage via the microphone conductor is enabled, the select switching means being configured provide a second switch position wherein data and audio transmission via the microphone conductor is enabled and charging of the energy storage means using the microphone bias voltage via the microphone conductor is disabled.

The peripheral apparatus as claimed above being further configured to produce sensor data for transfer to a mobile device via the microphone conductor of the audio jack.

The peripheral apparatus as claimed above further including a data swing calibration means to regulate voltage swing when the energy storage means is transitioning between charging and not charging.

A mobile apparatus comprising: logic means, at least a portion of which is partially implemented in hardware, the logic means configured to include a filtering means coupled with an output of an analog-to-digital converter (ADC), the filtering means being configured to isolate encoded data received by the ADC in an audio band signal microphone conductor of an audio jack.

The mobile apparatus as claimed above wherein the encoded data is biometric sensor data.

The mobile apparatus as claimed above wherein the logic means is implemented in a mobile phone.

The mobile apparatus as claimed above wherein: the logic means being configured to produce a switching tone on an audio signal conductor of the audio jack, the switching tone selectively signaling a first state when data and audio reception via the microphone conductor is disabled, the switching tone selectively signaling a second state when data and audio reception via the microphone conductor is enabled.

The mobile apparatus as claimed above wherein the switching tone is a single frequency tone in the ultrasonic range in a left speaker for a pre-determined time period.

The mobile apparatus as claimed above being configured to isolate encoded data received in an audio band signal via, the microphone conductor of the audio jack.

A non-transitory machine-useable storage medium embodying instructions which, when executed by a machine, cause the machine to: receive data generated by a data-producing element; encode the data into an audio band signal; combine the encoded data with audio signals on a microphone line; and transfer the combined audio signals to a mobile device via a microphone conductor of an audio jack.

The machine-useable storage medium as claimed above wherein the data-producing element is a biometric sensor.

The machine-useable storage medium as claimed above being further configured to encode the data into an audio hand signal using frequency-shift keying (FSK).

The machine-useable storage medium as claimed above wherein the mobile device is a mobile phone.

The machine-useable storage medium as claimed above being further configured to: provide a first switch position wherein data and audio transmission via the microphone conductor is disabled and charging of an energy storage component using a microphone bias voltage via the microphone conductor is enabled; and provide a second switch position wherein data and audio transmission via the microphone conductor is enabled and charging of the energy storage component using the microphone bias voltage via the microphone conductor is disabled.

The machine-useable storage medium as claimed above being further configured to produce sensor data for transfer to the mobile device via the microphone conductor of the audio jack.

The machine-useable storage medium as claimed above being further configured to regulate voltage swing when the energy storage component is transitioning between charging and not charging.

A non-transitory machine-useable storage medium embodying instructions which, when executed by a machine, cause the machine to: provide a filtering component coupled with an output of an analog-to-digital converter (ADC); and use the filtering component to isolate encoded data received by the ADC in an audio band signal via a microphone conductor of an audio jack.

The machine-useable storage medium as claimed above wherein the encoded data is biometric sensor data.

The machine-useable storage medium as claimed above wherein the filtering component is provided in a mobile phone.

The machine-useable storage medium as claimed above being further configured to produce a switching tone on an audio signal conductor of the audio jack, the switching tone selectively signaling a first state when data and audio reception via the microphone conductor is disabled, the switching tone selectively signaling a second state when data and audio reception via the microphone conductor is enabled.

The machine-useable storage medium as claimed above wherein the switching tone is a single frequency tone in the ultrasonic range in a left speaker for a pre-determined time period.

The machine-useable storage medium above being further configured to isolate encoded data received in an audio band signal via the microphone conductor of the audio jack.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A peripheral device comprising:
   a data-producing element;
   a microcontroller coupled to the data-producing element to receive data generated by the data-producing element, the microcontroller being further configured to encode the data into an audio band signal;
   an adder to combine the encoded data with audio signals on a microphone line, the adder being further configured to transfer the combined audio signals to a mobile device via a microphone conductor of an audio jack;
   an energy storage component coupled to the microphone conductor to be charged by the mobile device;
   a microphone coupled to the microphone conductor;
   a select switch coupled to the energy storage component, the microphone, and the microphone conductor, the select switch including a first switch position in which data and audio transmission via the microphone conductor is disabled and charging of the energy storage component via the microphone conductor is enabled, the select switch including a second switch position in which data and audio transmission via the microphone conductor is enabled and charging of the energy storage component is disabled; and
   a comparator to, in response to detecting that a voltage output by the microphone conductor exceeds a microphone bias voltage signal, the select switch to switch to the first position.

2. The peripheral device as claimed in claim 1, wherein the data-producing element is a biometric sensor.

3. The peripheral device as claimed in claim 1, wherein the microcontroller being further configured to encode the data into an audio band signal using frequency-shift keying (FSK).

4. The peripheral device as claimed in claim 1, wherein the mobile device is a mobile phone.

5. The peripheral device as claimed in claim 1, wherein the data producing element is to produce sensor data for transfer to a mobile device via the microphone conductor of the audio jack.

6. The peripheral device as claimed in claim 1, further including a data swing calibration component to regulate voltage swing when the energy storage component is transitioning between charging and not charging.

7. The peripheral claimed in claim 1, wherein the energy storage component is a battery of the peripheral.

8. A mobile device comprising:
   logic, at least a portion of which is partially implemented in hardware, the logic including a filtering component coupled with an output of an analog-to-digital converter (ADC), the filtering component being configured to isolate encoded data received by the ADC in an audio band signal via a microphone conductor of an audio jack, a select switch to select between outputting a microphone bias voltage on the microphone conductor or outputting a voltage that exceeds the microphone bias voltage on the microphone conductor, the voltage output on the microphone conductor selectively signaling a first state when data and audio reception via the microphone conductor is disabled to charge an energy storage component of a peripheral device by the mobile device or a second state when data and audio reception via the microphone conductor is enabled.

9. The mobile device as claimed in claim 8, wherein the encoded data is biometric sensor data.

10. The mobile device as claimed in claim 8, wherein the mobile device is a mobile phone.

11. The mobile device as claimed in claim 8, being configured to isolate encoded data received in an audio band signal via the microphone conductor of the audio jack.

12. A system comprising:
   a peripheral device including:
      a data-producing element,
      a microcontroller coupled to the data-producing element to receive data generated by the data-producing element, the microcontroller to encode the data into an audio band signal,
      an adder to combine the encoded data with audio signals on a microphone line, the adder to transfer the combined audio signals to a mobile device via a microphone conductor of an audio jack,
      an energy storage component coupled to the microphone conductor to be charged by a microphone bias voltage from the mobile device,
      a microphone coupled to the microphone bias voltage,
      a select switch coupled to the energy storage component, the microphone, and the microphone conductor, the select switch including a first switch position in which data and audio transmission via the microphone conductor is disabled and charging of the energy storage component via the microphone conductor is enabled, the select switch including a second switch position in which data and audio transmission via the microphone conductor is enabled and charging of the energy storage component is disabled, and
      a comparator to, in response to detecting that a voltage output by the microphone conductor exceeds a microphone bias voltage signal, the select switch to switch to the first position; and
   a mobile device including logic, at least a portion of which is partially implemented in hardware, the logic configured to include a filtering component coupled with an output of an encoder/decoder (codec), which includes an analog-to-digital converter (ADC) configured to be coupled to the microphone conductor of the audio jack, the filtering component being configured to isolate the encoded data received in the combined audio signals via the microphone conductor of the audio jack, and a select switch to select between outputting a microphone bias voltage on the microphone conductor or outputting a voltage that exceeds the microphone bias voltage on the microphone conductor, the voltage output on the microphone conductor selectively signaling a first state when data and audio reception via the microphone conductor is disabled to charge an energy storage component of a peripheral device by the mobile device or a second state when data and audio reception via the microphone conductor is enabled.

13. The system as claimed in claim 12, wherein the encoded data is biometric sensor data.

14. The system as claimed in claim 12, wherein the mobile device is a mobile phone.

15. The system as claimed in claim 12, wherein the peripheral device is further configured to produce sensor data for transfer to the mobile device via the microphone conductor of the audio jack.

16. A non-transitory machine-useable storage medium embodying instructions which, when executed by a machine, cause the machine to at least:
provide a filtering component coupled with an output of an analog-to-digital converter (ADC);
use the filtering component to isolate encoded data received by the ADC in an audio band signal via a microphone conductor of an audio jack; and
produce a switching signal, based on a state of an audio driver, to control a select switch to select between outputting a microphone bias voltage on the microphone conductor or outputting a voltage that exceeds the microphone bias voltage on the microphone conductor, the voltage output on the microphone conductor selectively signaling a first state when data and audio reception via the microphone conductor is disabled to charge an energy storage component of a peripheral device by the mobile device or a second state when data and audio reception via the microphone conductor is enabled.

17. The non-transitory machine-useable storage medium as claimed in claim 16, wherein the filtering component is provided in a mobile phone.

\* \* \* \* \*